(12) United States Patent
Tanabe et al.

(10) Patent No.: US 11,361,115 B2
(45) Date of Patent: Jun. 14, 2022

(54) DESIGN ASSISTANCE SYSTEM, DESIGN ASSISTANCE PROGRAM, AND DESIGN ASSISTANCE METHOD

(71) Applicant: MISUMI CORPORATION, Tokyo (JP)

(72) Inventors: Yoshitaka Tanabe, Tokyo (JP); Kazuya Murakami, Tokyo (JP); Yuuki Maetani, Tokyo (JP); Yosuke Hamada, Tokyo (JP); Hiroyoshi Hamada, Tokyo (JP); Masahiro Motohashi, Tokyo (JP); Yoshitaka Hayafune, Tokyo (JP); Hitoshi Ura, Tokyo (JP)

(73) Assignee: Misumi Corporation, Tokyo (JP)

( * ) Notice: Subject to any disclaimer, the term of this patent is extended or adjusted under 35 U.S.C. 154(b) by 714 days.

(21) Appl. No.: 15/758,644

(22) PCT Filed: Aug. 9, 2016

(86) PCT No.: PCT/JP2016/073473
§ 371 (c)(1),
(2) Date: Mar. 8, 2018

(87) PCT Pub. No.: WO2017/056745
PCT Pub. Date: Apr. 6, 2017

(65) Prior Publication Data
US 2018/0246995 A1    Aug. 30, 2018

(30) Foreign Application Priority Data
Oct. 2, 2015   (JP) .............................. JP2015-197229

(51) Int. Cl.
*G06F 30/00* (2020.01)
*G06F 119/18* (2020.01)

(52) U.S. Cl.
CPC .......... *G06F 30/00* (2020.01); *G06F 2119/18* (2020.01)

(58) Field of Classification Search
CPC ...... G06F 30/00; G06F 2119/18; G06F 30/10; G06F 30/12; G06F 2111/00; G06F 2119/22; Y02P 90/02
See application file for complete search history.

(56) References Cited

U.S. PATENT DOCUMENTS

2002/0170192 A1\* 11/2002 Steffey ............... G05B 19/4202
33/503
2004/0145614 A1\*  7/2004 Takagaki ................ G06F 30/13
345/420

(Continued)

FOREIGN PATENT DOCUMENTS

CN           1524242 A      8/2004
JP       H03-229370 A     10/1991
(Continued)

*Primary Examiner* — Steven W Crabb
(74) *Attorney, Agent, or Firm* — Carrier Blackman & Associates, P.C.; Joseph P. Carrier; Jeffrey T. Gedeon

(57) ABSTRACT

To provide a design assistance system, a design assistance program, and a design assistance method which are capable of reducing or eliminating the burden on a designer of a structure when designing the structure. A design assistance system 10 includes an object recognizing unit 112 and an interference determining unit 113. The object recognizing unit 112 recognizes an object existence area which is an existence area of a different object A2 from the structure A1 on a three-dimensional coordinate system in accordance with information including the position of the object A2 on the three-dimensional coordinate system which has been specified through an input unit 12. The interference determining unit 113 determines the presence or absence of interference between each of plurality of members and the (Continued)

object A2 based on respective member existence areas of the plurality of members and the object existence area.

9 Claims, 8 Drawing Sheets

(56) References Cited

U.S. PATENT DOCUMENTS

| | | | | |
|---|---|---|---|---|
| 2005/0102051 A1* | 5/2005 | Okada | ................ | G06F 30/00 |
| | | | | 700/98 |
| 2006/0155407 A1* | 7/2006 | Azuma | ................ | G06F 30/00 |
| | | | | 700/105 |
| 2010/0223032 A1* | 9/2010 | Reghetti | ................ | G06F 30/00 |
| | | | | 703/1 |
| 2011/0050686 A1* | 3/2011 | Nojima | ............... | G06F 3/04815 |
| | | | | 345/419 |

FOREIGN PATENT DOCUMENTS

| | | | |
|---|---|---|---|
| JP | 2003-141191 | A | 5/2003 |
| JP | 2009-069908 | A | 4/2009 |
| JP | 2010-122788 | A | 6/2010 |
| JP | 2010-224765 | A | 10/2010 |
| JP | 2010-272051 | A | 12/2010 |
| JP | 2011-216024 | A | 10/2011 |
| JP | 2012-108734 | A | 6/2012 |
| JP | 2014-10676 | A | 1/2014 |
| JP | 5388076 | B1 | 1/2014 |
| JP | 2015-125523 | A | 7/2015 |

* cited by examiner

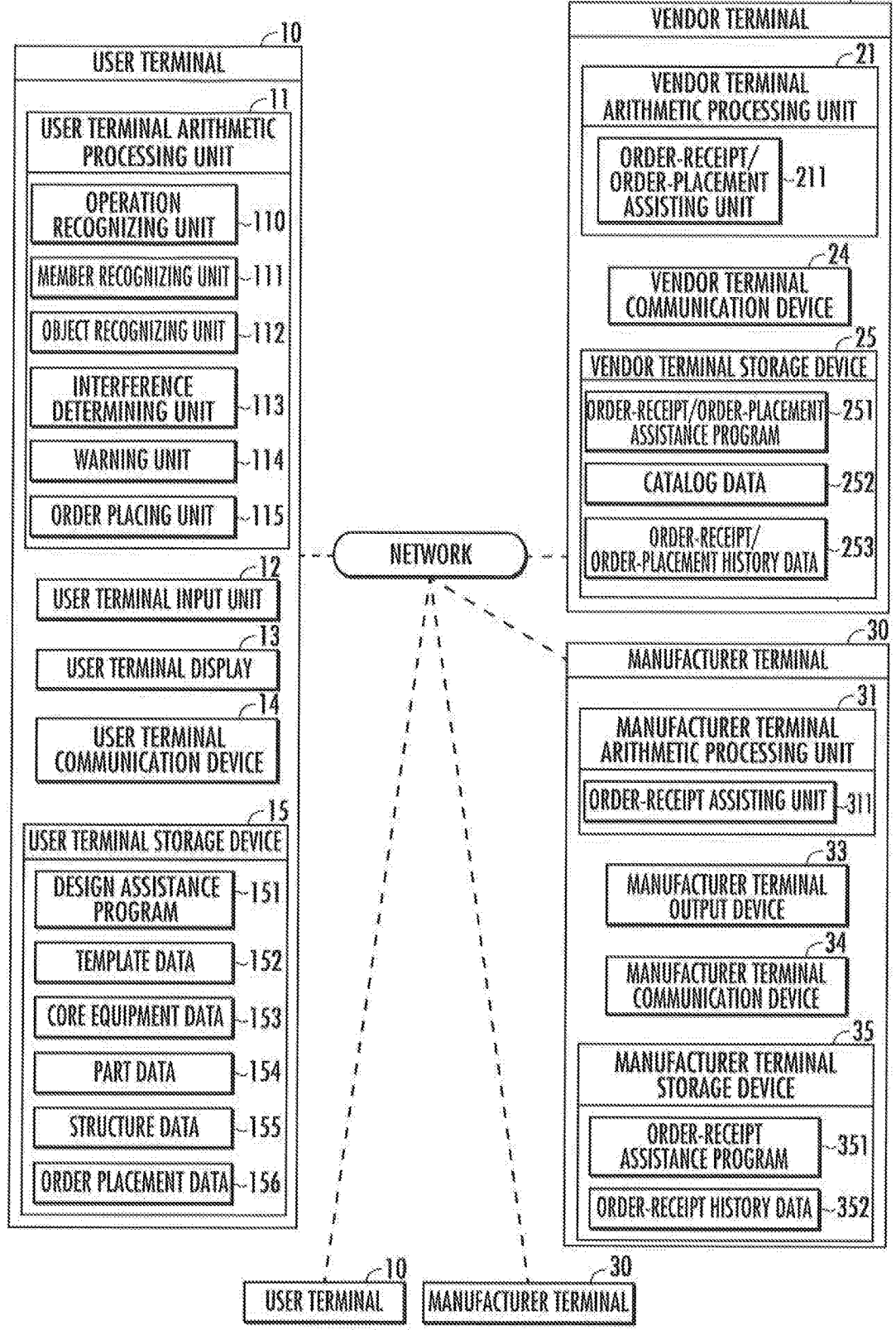

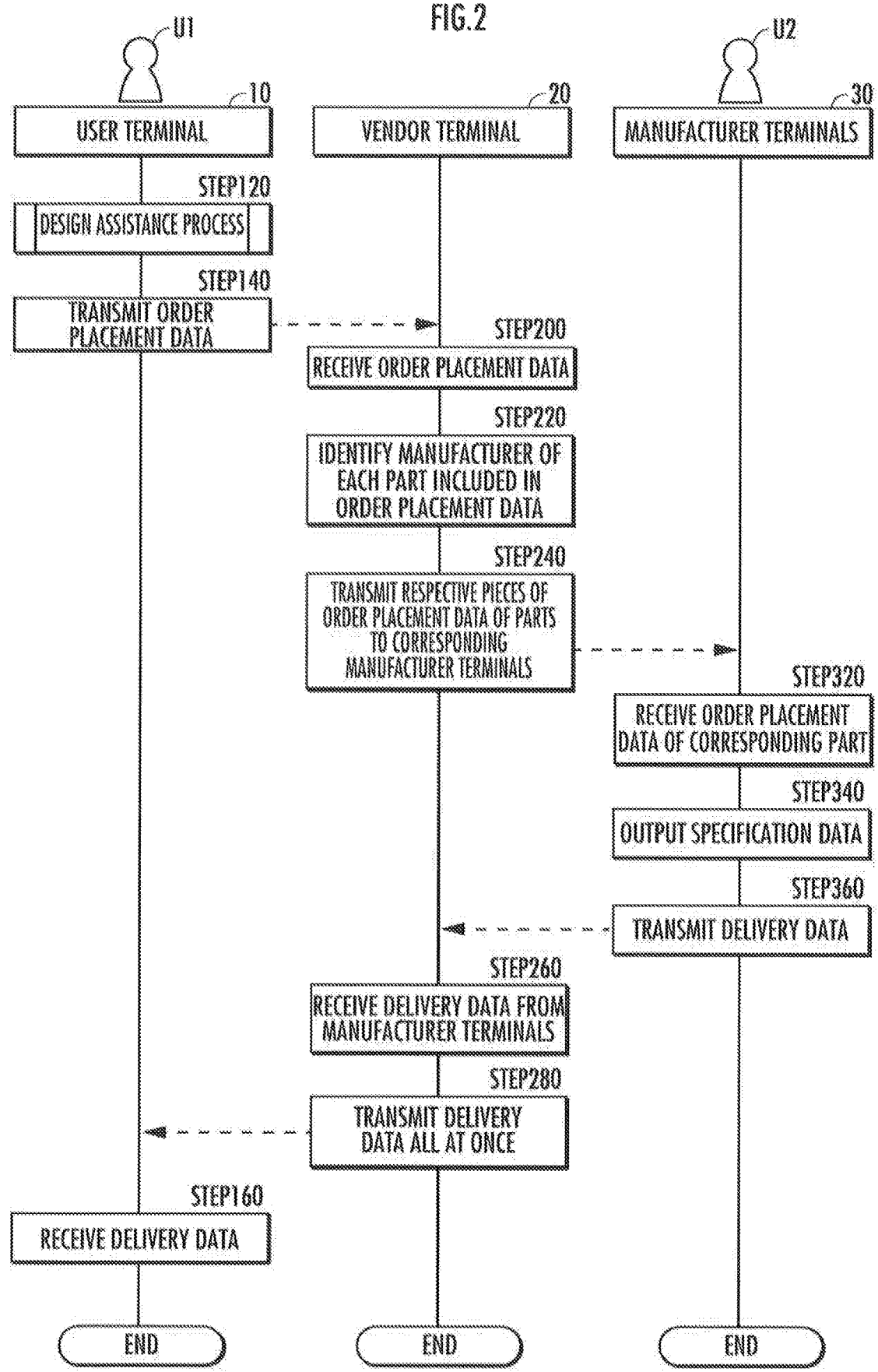

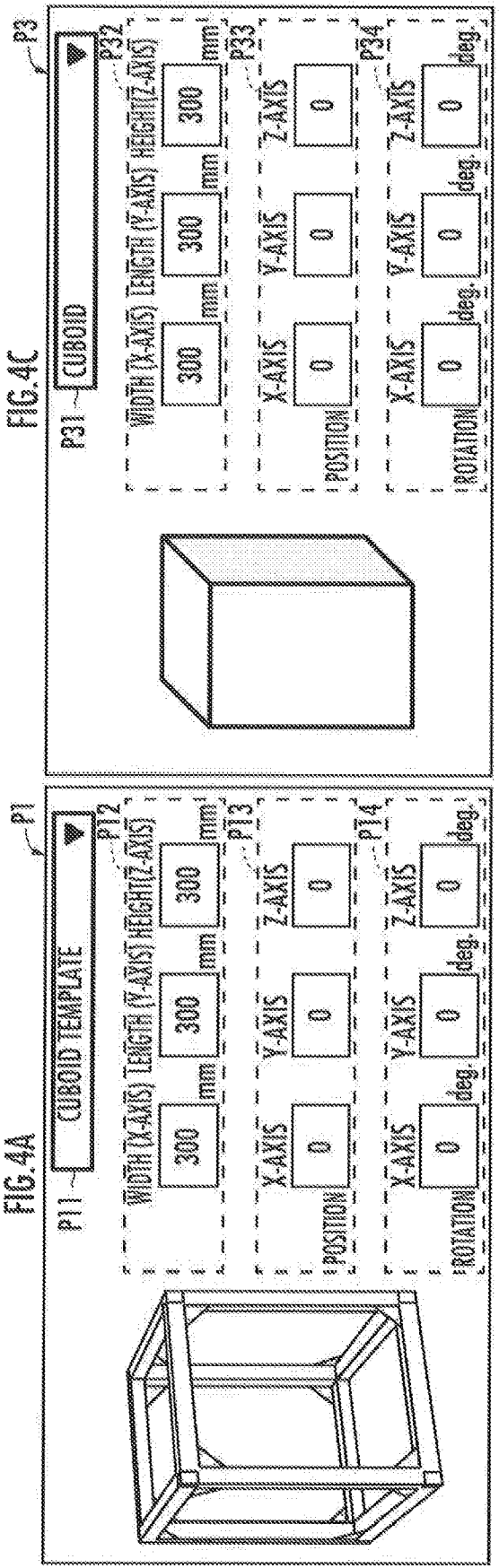

DESIGN ASSISTANCE SYSTEM, DESIGN ASSISTANCE PROGRAM, AND DESIGN ASSISTANCE METHOD

TECHNICAL FIELD

The present invention relates to a design assistance system, a design assistance program, and a design assistance method of assisting the design of a structure.

BACKGROUND ART

Conventionally, in factories, a stand for installing a manufacturing machine, etc. and a device cover for protecting the machine, etc. are used. Furthermore, in semiconductor factories or the like, a clean booth for putting semiconductor manufacturing equipment, etc. in a clean environment is used. Such a structure as the stand and device cover or the clean booth is constructed by installing a door or a door panel, etc. on a basic frame that is a framework. This basic frame is made by connecting plurality of frame members that are, for example, long members made of aluminum.

To assist the design of such a structure, for example, there has been proposed a three-dimensional model assembly assistance system which designs a structure by selecting an existing part model from a part model database having stored in a storage resource and fitting the existing part model into a wireframe model having position information of a part model to be arranged (see Patent Literature 1).

An aspect of this three-dimensional model assembly assistance system includes an interference determining unit which determines if the selected existing part model interferes with other existing part models fitted into the wireframe model.

According to this aspect of the three-dimensional model assembly assistance system, it is possible to make a designer of a structure easily recognize the presence or absence of interference.

CITATION LIST

Patent Literature

Patent Literature 1: Japanese Patent Application Laid-Open No. 2011-216024

SUMMARY OF INVENTION

Technical Problem

In general, in the design of a structure, interference with different objects from the structure, such as an object existing around a place where the structure is arranged and an object mounted or stored in the structure when the structure is used, needs to be taken into consideration. For example, a structure A1 shown in FIG. 7 is a structure which houses a device A2; in the design of this structure A1, not only interference between parts used in the structure A1 but interference between the structure A1 and the device A2 needs to be considered.

Designing a structure while taking interference with other objects into consideration in this way increases the burden on a designer of the structure.

Accordingly, in view of this problem, the present invention is intended to provide a design assistance system, a design assistance program, and a design assistance method which are capable of reducing or eliminating the burden on a designer of a structure when designing the structure.

Solution to Problem

A design assistance system of the present invention is a design assistance system which assists the design of a structure composed of a combination of plurality of members with CAD. The design assistance system includes an input unit configured to accept an input from a user; a member recognizing unit configured to recognize member existence areas which are respective existence areas of the plurality of members on a three-dimensional coordinate system in accordance with an input of the user to the input unit; an object recognizing unit configured to recognize an object existence area which is an existence area of a different object from the structure on the three-dimensional coordinate system in accordance with information including the position of the object on the three-dimensional coordinate system which has been specified through the input unit; an interference determining unit configured to determine the presence or absence of interference between each of the plurality of members and the object based on the member existence areas of the plurality of members and the object existence area; and a warning output unit configured to output information indicating that at least one of the members and the object interfere with each other, provided that the at least one of the members and the object have been determined to interfere with each other.

Incidentally, a component of the present invention "recognizing" an existence area unit performing every information processing for confirming the existence area for other information processing, such as directly confirming the existence area from information input from the user and calculating or deciding information by performing specified arithmetic processing on basic information input from the user.

The design assistance system of the present invention includes the input unit, the member recognizing unit, the object recognizing unit, an interference determining unit, and the warning output unit.

According to the design assistance system of the present invention, the existence areas (the member existence areas) of the plurality of members composing the structure on the three-dimensional coordinate system are recognized by the member recognizing unit in accordance with an input of the user to the input unit, and the existence area (the object existence area) of the different object from the structure on the three-dimensional coordinate system is recognized by the object recognizing unit in accordance with information including the position of the object on the three-dimensional coordinate system which has been specified through the input unit.

Then, the presence or absence of interference between each of the plurality of members and the object is determined by the interference determining unit based on the member existence areas of the plurality of members and the object existence area.

Provided that at least one of the members and the object have been determined to interfere with each other, the warning output unit outputs information indicating that the at least one of the members and the object interfere with each other.

Therefore, using the design assistance system of the present invention, the user (a designer of the structure) can easily recognize the presence or absence of interference between any of the members composing the structure and an object by causing the object recognizing unit to recognize an existence area of the object to be considered when the structure is designed through the input unit at the time of design of the structure. As a result, the burden on the structure designer cart be reduced or eliminated.

It is preferable that in the design assistance system of the present invention, the object recognizing unit is configured to recognize the object existence area based on the shape of the object and the dimensions and position of the object on the three-dimensional coordinate system which have been specified through the input unit.

According to the design assistance system having this configuration, the object existence area is recognized based on the shape of the object and the dimensions and position of the object on the three-dimensional coordinate system which have been specified through the input unit; therefore, an input of other detailed information on the object can be omitted. As a result, the burden on the designer of the structure when designing the structure can be reduced or eliminated.

It is preferable that in the design assistance system of the present invention, the object recognizing unit is configured to recognize the object existence area based on CAD data of the object and the position of the object on the three-dimensional coordinate system which have been specified through the input unit.

According to the design assistance system having this configuration, the object existence area is recognized based on CAD data of the object and the position of the object on the three-dimensional coordinate system which have been specified through the input unit. Therefore, the designer of the structure can easily check the presence or absence of interference between any of the members composing the structure and the object by reusing previously-created CAD data of the object. As a result, the burden on the designer of the structure can be further reduced or eliminated.

It is preferable that the design assistance system of the present invention further includes an image display unit configured to display thereon an image of the members and an image of the object in the three-dimensional coordinate system, and the member recognizing unit is configured to recognize a guide position which is a candidate arrangement position of a member on the outside of the object based on the object existence area and display an image of the member arranged in the guide position on the image display unit.

According to the design assistance system having this configuration, the member recognizing unit recognizes a guide position which is a candidate arrangement position of a member on the outside of the object according to the object existence area and displays an image of the member arranged in the guide position on the image display unit.

Using the design assistance system having this configuration, the user (the designer of the structure) can easily recognize the arrangement position of a member on the outside of the object; therefore, the burden on the designer of the structure can be further reduced or eliminated.

A design assistance program of the present invention causes a system, which has an input unit configured to accept an input from a user and an output unit configured to output information, to serve as a member recognizing unit configured to recognize member existence areas which are respective existence areas of plurality of members composing a structure on a three-dimensional coordinate system in accordance with an input of the user to the input unit; an object recognizing unit configured to recognize an object existence area which is an existence area of a different object from the structure on the three-dimensional coordinate system in accordance with information including a position of the object on the three-dimensional coordinate system which has been specified through the input unit; an interference determining unit configured to determine the presence or absence of interference between each of the plurality of members and the object based on the member existence areas of the plurality of members and the object existence area; and a warning output unit configured to output information indicating that at least one of the members and the object interfere with each other to the output unit, provided that the at least one of the members and the object have been determined to interfere with each other.

By causing the system to execute the design assistance program of the present invention, the same effects as those of the above-described design assistance system of the present invention can be obtained.

A design assistance method of the present invention is a method implemented by a system which has an input unit configured to accept an input from a user and an output unit configured to output information, and includes a member recognizing step of recognizing member existence areas which are respective existence areas of plurality of members composing a structure on a three-dimensional coordinate system in accordance with an input of the user to the input unit; an object recognizing step of recognizing an object existence area which is an existence area of a different object from the structure on the three-dimensional coordinate system in accordance with information including a position of the object on the three-dimensional coordinate system which has been specified through the input unit; an interference determining step of determining presence or absence of interference between each of the plurality of members and the object based on the member existence areas of the plurality of members and the object existence area; and a warning output step of outputting information indicating that at least one of the members and the object interfere with each other to the output unit, provided that the at least one of the members and the object have been determined to interfere with each other.

By applying the design assistance method of the present invention to the system and implementing the design assistance method in the system, the same effects as those of the above-described design assistance system of the present invention can be obtained.

BRIEF DESCRIPTION OF DRAWINGS

FIG. 1 is an entire configuration diagram in a present embodiment.

FIG. 2 is a flowchart of structure manufacturing assistance.

FIG. 4A is a diagram showing a template specification image.

FIG. 4B is a diagram showing a core-equipment specification image.

FIG. 4C is a diagram showing a simplified-model specification image.

FIG. 4D is a diagram showing a member arrangement image.

DESCRIPTION OF EMBODIMENTS

Figure 3A:
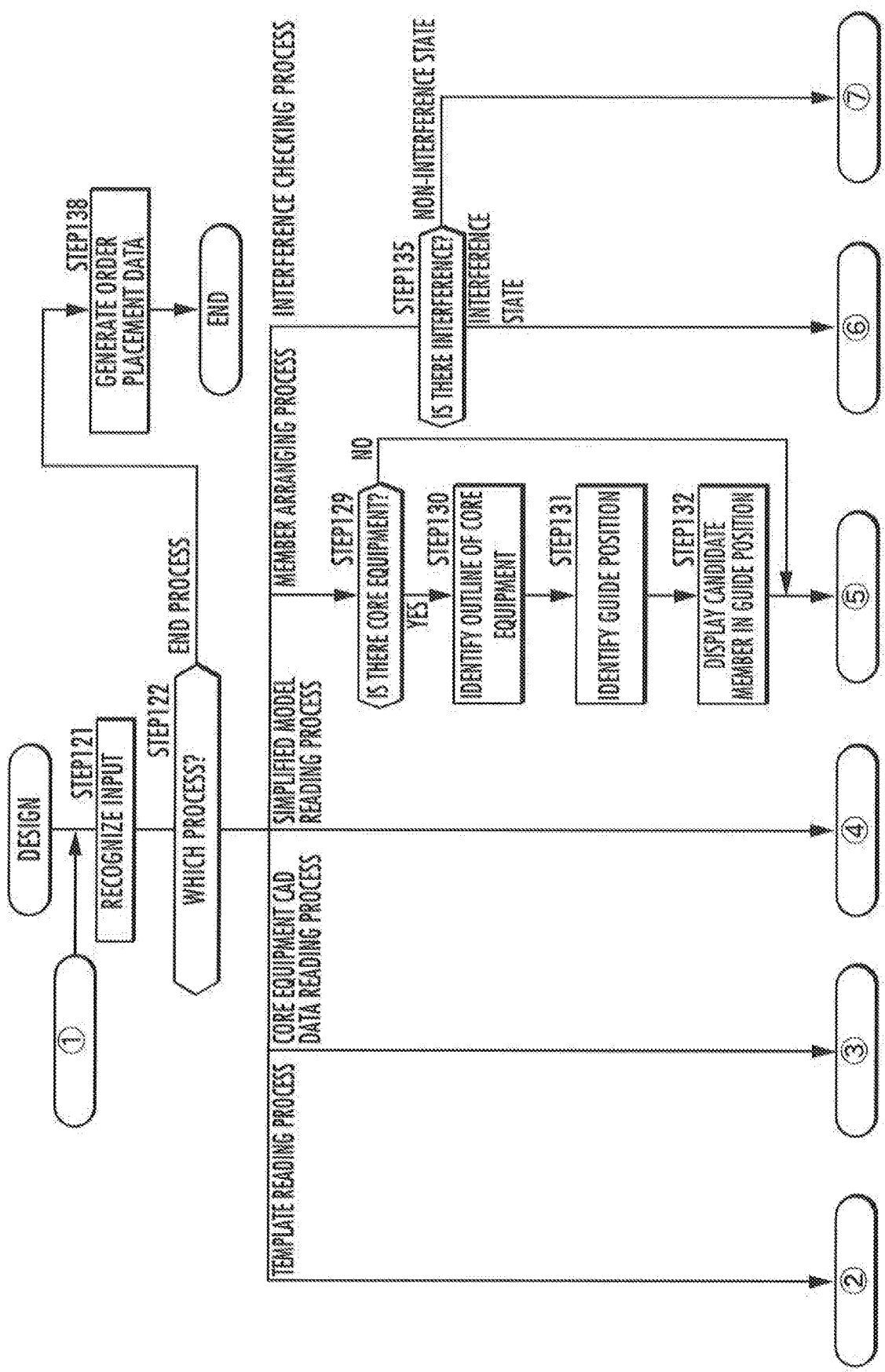
FIG. 3A is a flowchart of (the first half of) structure design assistance.

An embodiment of the present invention is described with reference to FIG. 1.

In the present embodiment, plurality of user terminals 10, one vendor terminal 20, and plurality of manufacturer terminals 30 are interconnected by a network.

The user terminals 10 correspond to a "design assistance system" according to the present invention, and execute a design assistance program (a CAD application program) to assist a user (a designer) to design a structure.
(Configuration of User Terminal)

The user terminals 10 are provided with, for example, a desktop computer or a laptop computer, and include a user terminal arithmetic processing unit 11, a user terminal input unit 12, a user terminal display 13, a user terminal communication device 14, and a user terminal storage device 15.

The user terminal arithmetic processing unit 11 is provided with a CPU or the like which performs an arithmetic process. The user terminal arithmetic processing unit 11 reads a design assistance program 151 from the user terminal storage device 15 and performs an arithmetic process defined by the design assistance program 151, thereby serving as an operation recognizing unit 110, a member recognizing unit 111, an object recognizing unit 112, an interference determining unit 113, a warning unit 114, and an order placing unit 115.

The user terminal input unit 12 is provided with input equipment, such as a keyboard, a mouse, a microphone, and a touch panel. A user can input a variety of information through the user terminal input unit 12. Incidentally, the user terminal input unit 12 corresponds to an "input unit" of the present invention.

The user terminal display 13 is configured to display an image thereon. Incidentally, the user terminal display 13 composes an "output unit" of the present invention, and the warning unit 114 and the user terminal display 13 compose a "warning output unit" of the present invention. Furthermore, the user terminal display 13 composes an "image display unit" of the present invention.

Moreover, the "output unit" or the "warning output unit" of the present invention can be composed of a voice output device, such as a speaker, or an output device, such as a printing device, in addition to or instead of the user terminal display 13.

The user terminal communication device 14 is configured to be able to transmit/receive a variety of information to/from another terminal (the vendor terminal 20) via the network by wired or wireless communication.

The user terminal storage device 15 is provided with storage, such as a RAM, a ROM, or art HDD, and is configured to store therein a variety of information, such as data used in an arithmetic process performed by the user terminal arithmetic processing unit 11, and read out the information.

The design assistance program 151, template data 152, core equipment data 153, and part data 154 have been stored in the user terminal storage device 15 in advance. A part of the design assistance program 151, the template data 152, the core equipment data 153, and the part data 154 can each be downloaded from the outside (for example, the vendor terminal 20) through the user terminal communication device 14 as needed when an arithmetic process is performed and be stored in the user terminal storage device 15.

Furthermore, structure data 155 and order placement data 156 which are created in accordance with a user's operation using a CAD application of the design assistance program 151 may be stored in the user terminal storage device 15. Moreover, the structure data 155 created by the user can be stored as new template data 152 or new core equipment data 153 in accordance with the user's operation.

The design assistance program 151 is a CAD application program of assisting the design of a structure, which is mainly composed of aluminum frames and is capable of storing therein various articles, on a virtual three-dimensional coordinate system (hereinafter, coordinate axes of the three-dimensional coordinate system which are perpendicular to one another are referred to as the X-axis, the Y-axis, and the Z-axis). Details of the CAD application of the design assistance program 151 will be described later.

Figure 7:
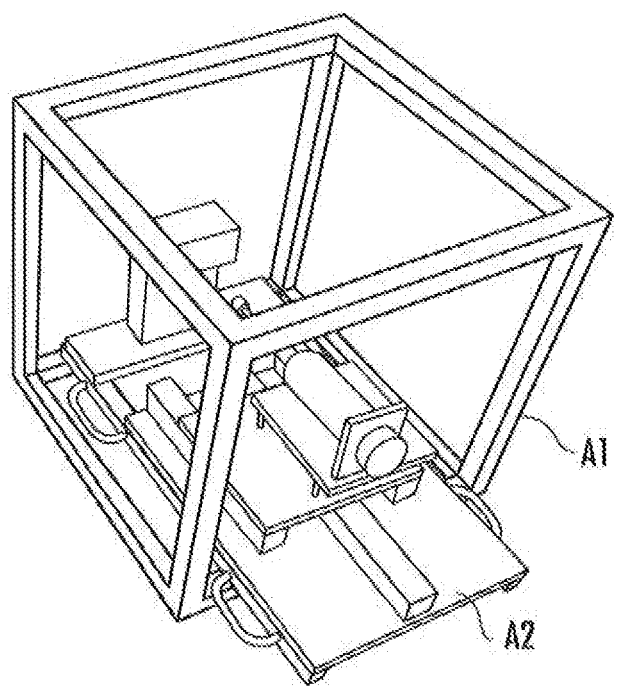
FIG. 7 is a diagram showing a usage state of the structure.

The template data 152 is CAD data on the shapes often used in a structure to be designed, such a cuboid as the structure A1 shown in FIG. 7 made up of twelve cuboid aluminum frames combined as sides. The template data 152 includes the name of each shape (such as cuboid), the reference position of an assembled product (for example, the position of the center of gravity of a structure), X-, Y-, and Z-axis coordinate values of each part on a reference scale, and an ID of the part.

Incidentally, a "template" is a model for simply specifying an assembled product composed of the assembly of plurality of members.

The core equipment data 153 is CAD data of art object (core equipment) housed in a structure to be designed, such as the device A2 shown in FIG. 7. Incidentally the process defined in the design assistance program according to the present embodiment can be also applied equally to CAD data of objects existing around the structure to be designed, such as an object put above the structure to be designed, or CAD data of a facility in which the structure to be designed is installed, besides the CAD data of the core equipment.

The core equipment data 153 includes X-, Y-, and Z-axis coordinate values indicating the position of each part composing core equipment in the reference position of the core equipment (for example, the position of the center of gravity of the core equipment), an ID of the part, and color of the core equipment when displayed.

The part data 154 is CAD data of parts which can be used to compose a structure to be designed, and, in the present embodiment, is CAD data of an aluminum frame, screws and a cap which are attached to the aluminum frame, a door attachable to the aluminum frame, etc. The part data 154 includes, with respect to each of parts, X-, Y-, and Z-axis coordinate values indicating the position of each part composing core equipment in the reference position of the core equipment, an ID of the part, and X-, Y-, and Z-axis coordinate values of a vector indicating the extensible direction.

The structure data 155 is CAD data of a structure to be designed, and includes X-, Y-, and Z-axis coordinate values indicating the position of each part used in the structure and art ID of the part.

The order placement data 156 is data generated based on the structure data 155, and includes, in addition to the structure data 155, a user ID for identifying a user, a structure ID for identifying a structure, and an ID, dimensions, and the number of each part of the structure.

(Configuration of Vendor Terminal)

The vendor terminal 20 is provided with, for example, a server computer, and includes a vendor terminal arithmetic processing unit 21, a vendor terminal communication device 24, and a vendor terminal storage device 25.

The vendor terminal arithmetic processing unit 21 is provided with an arithmetic processing unit such as a CPU which performs an arithmetic process. The vendor terminal arithmetic processing unit 21 reads an order-receipt/order-placement assistance program 251 from the vendor terminal storage device 25 and performs an arithmetic process defined by the order-receipt/order-placement assistance program 251, thereby serving as an order-receipt/order-placement assisting unit 211.

The vendor terminal communication device 24 is configured to be able to transmit/receive a variety of information to/from another terminal (the user terminals 10 and the manufacturer terminals 30) via the network by wired or wireless communication.

The vendor terminal storage device 25 is provided with storage, such as a RAM, a ROM, or an HDD, and is configured to store therein a variety of information, such as data used in an arithmetic process, and read out the information.

The order-receipt/order-placement assistance program 251 and catalog data 252 have been stored in the vendor terminal storage device 25 in advance. Furthermore, the vendor terminal storage device 25 is configured to store therein order-receipt/order-placement history data 253 generated as a result of an arithmetic process defined in the order-receipt/order-placement assistance program 251.

Details of a process of the order-receipt/order-placement assistance program 251 will be described later.

The catalog data 252 includes a part ID of a part and a manufacturer ID identifying a manufacturer of the part in a manner associated with each other.

The order-receipt/order-placement history data 253 includes a user ID indicating a user terminal 10 which has placed an order for a structure, the same content as the content included in order placement data 156, and a manufacturer ID of a manufacturer to which an order for a part with a part ID included in the order placement data 156 has been sent in a manner associated with one another.

(Configuration of Manufacturer Terminal)

The manufacturer terminals 30 are provided with, for example, a desktop computer or a laptop computer, and include a manufacturer terminal arithmetic processing unit 31, a manufacturer terminal output device 33, a manufacturer terminal communication device 34, and a manufacturer terminal storage device 35.

The manufacturer terminal arithmetic processing unit 31 is provided with an arithmetic processing unit such as a CPU which performs an arithmetic process. The manufacturer terminal arithmetic processing unit 31 reads an order-receipt assistance program 351 from the manufacturer terminal storage device 35 and performs an arithmetic process defined by the order-receipt assistance program 351, thereby serving as an order-receipt assisting unit 311.

The manufacturer terminal output device 33 is provided with a display which displays an image thereon or a printing device which outputs a piece of paper with information printed.

The manufacturer terminal communication device 34 is provided with wired or wireless access and is configured to be able to transmit/receive a variety of information to/from another terminal the vendor terminal 20) via the network.

The manufacturer terminal storage device 35 is provided with storage, such as a RAM, a ROM, or an HDD, and is configured to store therein or read out a variety of information, such as data used in an arithmetic process. The order-receipt assistance program 351 has been stored in the manufacturer terminal storage device 35 in advance. Furthermore, the manufacturer terminal storage device 35 is configured to record order-receipt history data 352 generated through an arithmetic process defined in the order-receipt assistance program 351.

Details of a process of the order-receipt assistance program 351 will be described later.

The order-receipt history data 352 includes a vendor ID for identifying a vendor and a part ID, dimensions, and the number of a part which are included in order placement data of the part received from the vendor terminal 20.

(Overall Flow of Structure Manufacturing Assistance)

With reference to FIG. 2, the overall flow of an assistance process performed by terminals at the time of manufacturing (including design and order placement) of a structure is described with an example where a user U1 manufactures the structure A1 shown in FIG. 7. The structure A1 is a structure used to house the device A2.

First, at STEP 120 in FIG. 2, the user terminal arithmetic processing unit 11 (the operation recognizing unit 110, the member recognizing unit 111, the object recognizing unit 112, the interference determining unit 113, the warning unit 114, and the order placing unit 115) of a user terminal 10 performs a design assistance process of assisting the design of the structure A1 with CAD in accordance with an input of the user U1 detected by the user terminal input unit 12. Although a detailed process of design assistance will be described later, structure data 155 and order placement data 156 of a structure designed by the user U1 are generated through this design assistance.

At STEP 140 in FIG. 2, the order placing unit 115 transmits the order placement data 156 to the vendor terminal 20 through the user terminal communication device 14 in accordance with an input of the user U1 detected by the user terminal input unit 12.

At STEP 200 in FIG. 2, the vendor terminal arithmetic processing unit 21 (the order-receipt/order-placement assisting unit 211) of the vendor terminal 20 receives the order placement data 156 through the vendor terminal communication device 24.

At STEP 220 in FIG. 2, the order-receipt/order-placement assisting unit 211 identifies respective manufacturers of parts included in the order placement data 156 by referring to the catalog data 252.

At STEP 240 in FIG. 2, the order-receipt/order-placement assisting unit 211 transmits respective pieces of order placement data of the parts to the manufacturers identified at STEP 220 through the vendor terminal communication device 24.

At STEP 320 in FIG. 2, the manufacturer terminal arithmetic processing unit 31 (the order-receipt assisting unit 311) of each corresponding manufacturer terminal 30 receives the order placement data of the part addressed to its own manufacturer through the manufacturer terminal communication device 34.

At STEP 340 in FIG. 2, the order-receipt assisting unit 311 outputs specification data of the part, such as a part ID and the dimensions of the part, included in the order placement data to the manufacturer terminal output device 33. Each worker U2 prepares the part based on the specification data output to the manufacturer terminal output device 33.

At STEP 360 in FIG. 2, the order-receipt assisting unit 311 transmits delivery data including information of the prepared part and a structure ID of the structure A1 to the vendor terminal 20 through the manufacturer terminal communication device 34. Along with the transmission of this part information, the worker U2 ships the prepared part for the structure A1 to a vendor.

At STEP 260 in FIG. 2, the order-receipt/order-placement assisting unit 211 receives respective pieces of delivery data through the vendor terminal communication device 24, and then, at STEP 280 in FIG. 2, transfers the delivery data to the user terminals 10 through the vendor terminal communication device 24. Furthermore, along with this, a worker of the vendor sends respective parts for the structure A1 received from the manufacturers to the user U1.

At STEP 160 in FIG. 2, the order placing unit 115 displays the part information included in the delivery data sent from the vendor through the user terminal communication device 14 on the user terminal display 13. The order placing unit 115 can also display six principal views or the like of the structure A1 on the user terminal display 13 based on the structure data 155. The user U1 can complete the structure A1 shown in FIG. 7 by assembling the parts sent from the vendor while checking these pieces of information.

(Design Assistance Process)

Subsequently, details of the design assistance process at STEP 120 in FIG. 2 are described with reference to FIGS. 3 to 6.

In the present specification, we describe a process necessary to describe the present invention, and omits the other processes.

At STEP 121 in FIG. 3A, the operation recognizing unit 110 recognizes an input of the user U1 to the user terminal input unit 12. The operation recognizing unit 110 recognizes, for example, an operation (for example, a click operation or a tap operation or the like) to select a button corresponding to a process on an image displayed on the user terminal display 13 which has been input to the user terminal input unit 12.

At STEP 122 in FIG. 3A, the operation recognizing unit 110 determines which process the input requests. In the present embodiment, which one of "template reading process", "core equipment CAD data reading process", "simplified model reading process", "member arranging process", "interference checking process", and "end process" is determined.

Figure 3B:
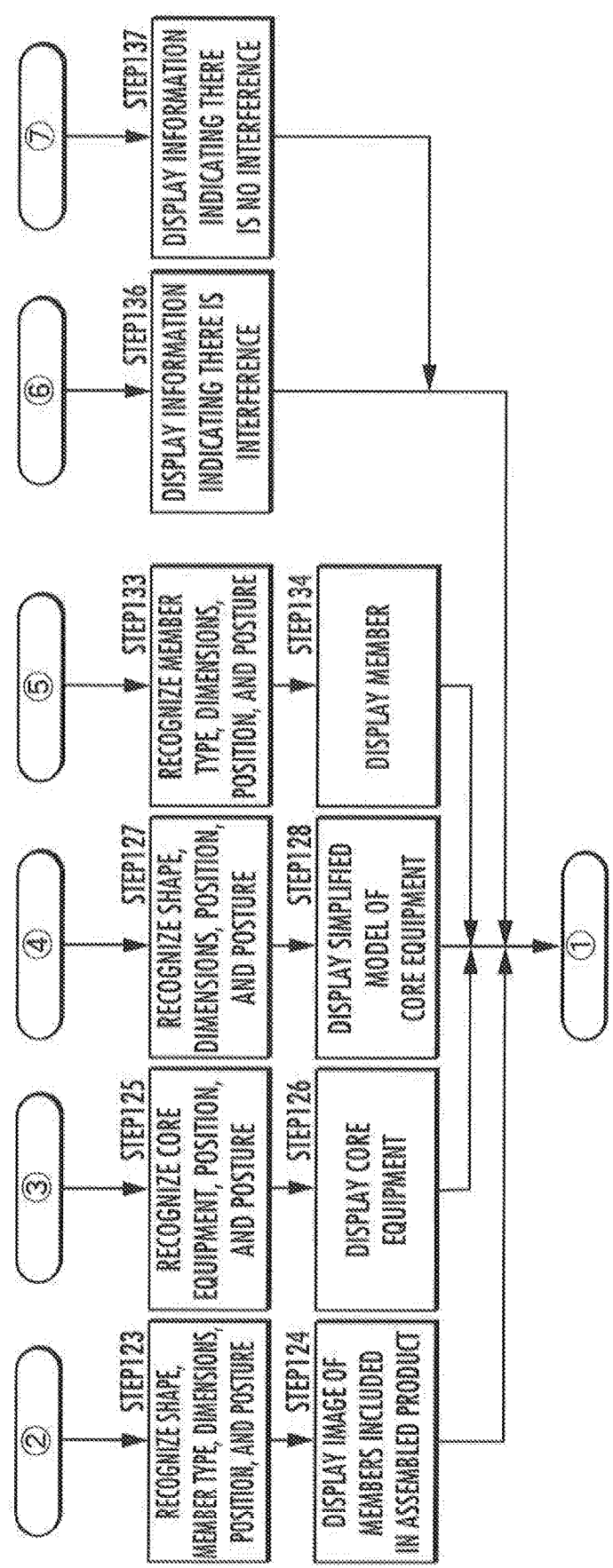
FIG. 3B is a flowchart of (the last half of) structure design assistance.

If a result of the determination by the operation recognizing unit 110 at STEP 122 in FIG. 3A is "template reading process", at STEP 123 in FIG. 3B, the member recognizing unit 111 recognizes the shape of a template to be read and the type of a member, and the dimensions, position, and posture of an assembled product in accordance with an input of the user U1 to the user terminal input unit 12.

For example, the member recognizing unit 111 displays a template specifying screen P1 shown in HG. 4A on the user terminal display 13.

The template specifying screen P1 includes a type specifying box P11 for specifying the type of a template to be read, a dimensions specifying box P12 for specifying the dimensions, such as the length, width, and height or the radius, of an assembled product, a position specifying box P13 for specifying the position on a three-dimensional coordinate system to arrange the assembled product (with respect to the reference position (for example, the position of the center of gravity) for positioning the assembled product, the position represented by X-, Y-, and Z-axis coordinate values), and a posture specifying box P14 for specifying the posture of the assembled product (the posture represented by respective rotation angles around the X-axis, the Y-axis, and the Z-axis).

Alternatively, the member recognizing unit 111 can recognize the type of a template to be read and the dimensions, position, and posture of an assembled product in accordance with a user's predetermined operation, such as a click operation, on a three-dimensional image.

Instead of or in addition to this, the member recognizing unit 111 can recognize the type of a template and the dimensions, position, and posture of an assembled product based on the position on a three-dimensional image specified by a user's predetermined operation, such as a click operation. In this case, for example, a checkbox can be provided near each of the boxes P11 to P14, and, while information (for example, the dimension in the X-axis direction) of some boxes whose checkbox has been checked can be recognized based on information input to the boxes P11 to P14, information (for example, the dimensions in the Y-axis direction and the Z-axis direction) of the other boxes whose checkbox has been unchecked can be recognized based on specification of the position on a three-dimensional coordinate system.

At STEP 124 in FIG. 3B, with reference to template data 152, the member recognizing unit 111 draws each member included in the assembled product on the three-dimensional coordinate system based on the type of the recognized template and the recognized dimensions, position, and posture of the assembled product, thereby displaying an image P15 of the assembled product shown in FIG. 4D.

After STEP 124, processes at STEPs 121 and onward in FIG. 3A are performed again.

If a result of the determination by the operation recognizing unit 110 at STEP 122 in FIG. 3A is "core equipment CAD data reading process", at STEP 125 in FIG. 3B, the object recognizing unit 112 recognizes CAD data of core equipment to be read and the position and posture of the core equipment in accordance with an input of the user U1 to the user terminal input unit 12. Incidentally, in addition to this, the object recognizing unit 112 can recognize the dimensions of the core equipment in accordance with an input of the user U1.

Alternatively, the object recognizing unit 112 can recognize CAD data of core equipment and the position and posture of the core equipment in accordance with a user's predetermined operation, such as a click operation, on a three-dimensional image.

For example, with reference to core equipment data 153, the object recognizing unit 112 displays a core-equipment specifying screen P2 shown in FIG. 4B on the user terminal display 13.

The core-equipment specifying screen P2 includes a CAD-data selection box P21 for selecting CAD data of core equipment, a position specifying box P22 for specifying the position on a three-dimensional coordinate system to arrange the core equipment, and a posture specifying box P23 for specifying the posture of the core equipment.

The object recognizing unit 112 recognizes the type, dimensions, position, and posture of each of the members composing the core equipment and the color of the core equipment based on information input to these boxes P21 to P23.

At STEP 126 in FIG. 3B, the object recognizing unit 112 draws each member included in the core equipment on the three-dimensional coordinate system based on the type, dimensions, position, and posture of each of the members composing the core equipment, thereby displaying an image P25 of the core equipment shown in FIG. 4D.

After STEP 126, the processes at STEPs 121 and onward in FIG. 3A are performed again.

If a result of the determination by the operation recognizing unit 110 at STEP 122 in FIG. 3A is "simplified model reading process", at STEP 127 in FIG. 3B, the object recognizing unit 112 recognizes the shape, dimensions, position, and posture for specifying the core equipment with a simplified model in accordance with an input of the user U1 to the user terminal input unit 12.

For example, the object recognizing unit 112 displays a simplified-model specifying screen P3 shown in FIG. 4C on the user terminal display 13.

The simplified-model specifying screen P3 includes a shape selection box P31 for selecting the shape of a simplified model, a dimensions specifying box P32 for specifying the dimensions, such as the length, width, and height or the radius, of the simplified model, a position specifying box P33 for specifying the position on a three-dimensional coordinate system to arrange the simplified model, and a posture specifying box P34 for specifying the posture of the simplified model.

The object recognizing unit 112 recognizes the shape, dimensions, position, and posture of the simplified model of the core equipment based on information input to these boxes P31 to P34. Incidentally, as for the color of the simplified model of the core equipment, the color specified by a user can be recognized, or the color specified by a value which has been saved in a setup file in advance can be recognized.

Instead of or in addition to this, the object recognizing unit 112 can recognize the shape, dimensions, position, and posture for specifying the equipment with a simplified model based on the position on a three-dimensional image specified by a user's predetermined operation, such as a click operation. In this case, for example, a checkbox can be provided near each of the boxes P31 to P34, and, while information (for example, the dimension in the X-axis direction) of some boxes whose checkbox has been checked can be recognized based on information input to the boxes P31 to P34, information (for example, the dimensions in the Y-axis direction and the Z-axis direction) of the other boxes whose checkbox has been unchecked can be recognized based on specification of the position on a three-dimensional coordinate system.

At STEP 128 in FIG. 3B, the member recognizing unit 111 draws the simplified model on the three-dimensional coordinate system based on the shape, dimensions, position, and posture of the simplified model of the core equipment to be read, thereby displaying an image P35 of the simplified model shown in FIG. 4D.

After STEP 128, the processes at STEPs 121 and onward in FIG. 3A are performed again.

If a result of the determination by the operation recognizing unit 110 at STEP 122 in FIG. 3A is "member arranging process", at STEP 129 in FIG. 3A, the member recognizing unit 111 determines whether or not the core equipment (including the simplified model) has been read.

Figure 5A:
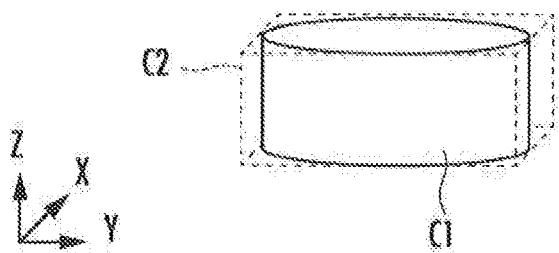
FIG. 5A is a diagram explaining a simplified outline having the minimum dimensions to contain core equipment.

If a result of the determination is affirmative (YES at STEP 129 in FIG. 3A), at STEP 130 in FIG. 3A, the member recognizing unit 111 recognizes a simplified outline of the core equipment having a predetermined shape. For example, as shown in FIG. 5A, the member recognizing unit 111 recognizes coordinate values of each vertex of a core equipment simplified outline C2 (a circumscribed cuboid) having the minimum dimensions to contain core equipment C1. The coordinate values of the vertices of the core equipment simplified outline C2 may be recognized as, for example, a pair of a maximum value and a minimum value in its existence range with respect to each of the X-axis, the Y-axis, and the Z-axis of the core equipment C1.

At STEP 131 in FIG. 3A, the member recognizing unit 111 recognizes the guide position of a member (a range of coordinate values indicating a candidate arrangement position of a member) based on the coordinate values of the vertices of the core equipment simplified outline C2.

Figure 5B:
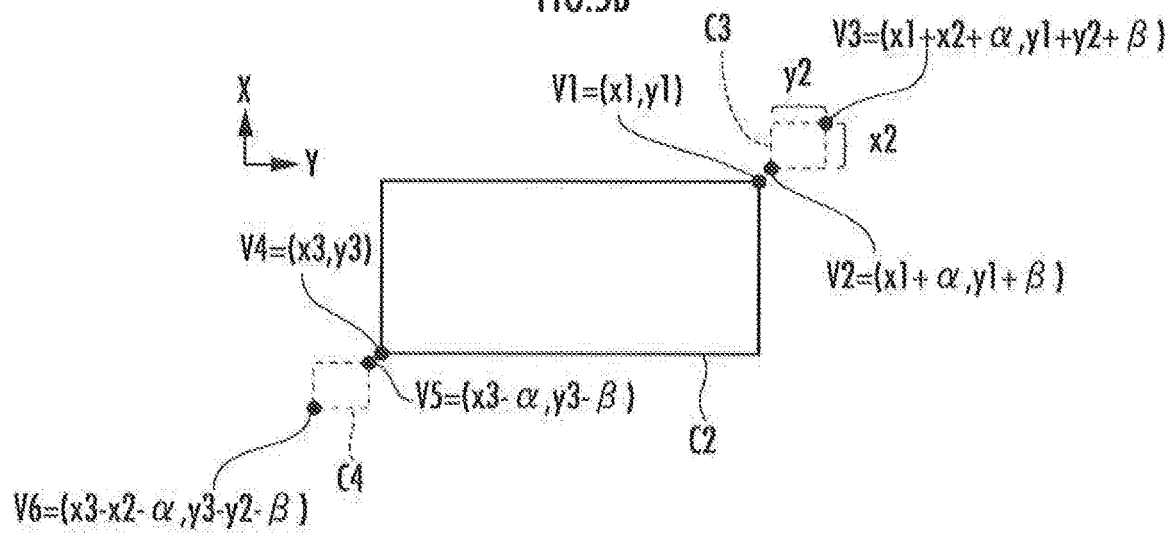
FIG. 5B is a diagram explaining the case where a guide position of a member in a direction in which the dimensions of the member are fixed is recognized.
Figure 5C:
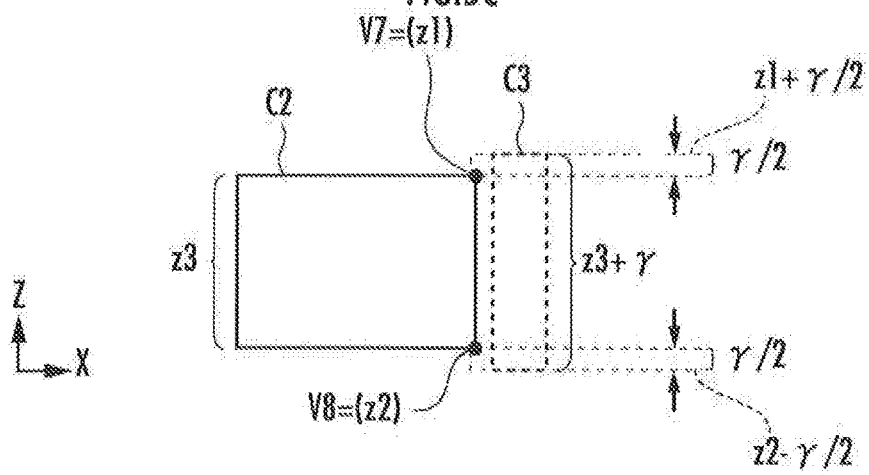
FIG. 5C is a diagram explaining the case where a guide position of a member in a direction in which the dimensions of the member are variable is recognized.

With FIGS. 5B and 5C, we describe a process for the member recognizing unit 111 to recognize the guide positions of frame members C3 and C4 of which the two dimensions (for example, the dimensions in the length direction and the width direction) out of the three dimensions is fixed and the remaining one dimension (for example, the dimension in the height direction) is variable.

FIG. 5B is a diagram of the core equipment simplified outline C2 in FIG. 5A viewed from the Z-axis direction (the height direction). For the sake of simplicity of description, in FIG. 5B, coordinate values are represented by coordinate values in two dimensions in the X-axis direction (the length direction) and the Y-axis direction (the width direction).

The member recognizing unit 111 recognizes each vertex of the core equipment simplified outline C2, and recognizes an outer point viewed from the recognized vertex as one vertex of the guide position.

For example, as shown in FIG. 5B, if an X-axis value X1 and a Y-axis value Y1 are a vertex V1 having the maximum value in coordinate values of the vertices included in the simplified outline C2, the member recognizing unit 111 recognizes coordinate values $(x1+\alpha, y1+\beta)$ obtained by adding predetermined values $\alpha$ and $\beta$ ($\alpha \geq 0$, $\beta \geq 0$) to coordinate values (x1, y1) of the vertex V1 as coordinate values of a vertex V2 on the side of the core equipment simplified outline C2 of the frame member C3. Incidentally, the member recognizing unit 111 reads $\alpha$ and $\beta$ from a predetermined setup file. For example, a user can freely change the values of $\alpha$ and $\beta$ by editing the setup file.

The member recognizing unit 111 recognizes coordinate values $(x1+x2+\alpha, y1+y2+\beta)$ obtained by adding a dimension x2 of the member C3 in the length direction and a dimension y2 of the member C3 in the width direction to the coordinate values $(y1+\alpha, y1\alpha\beta)$ of the vertex V2 as coordinate values of a vertex V3 placed diagonally to the vertex V2.

Furthermore, if the X-axis value X1 and the Y-axis value Y1 are a vertex V4 having the minimum value in the coordinate values of the vertices included in the core equipment simplified outline C2, the member recognizing unit 111 recognizes coordinate values $(x3-\alpha, y3-\beta)$ obtained by subtracting the predetermined values $\alpha$ and $\beta$ from coordinate values, y3) of the vertex V4 as coordinate values of a vertex V5 on the side of the core equipment simplified outline C2 of the frame member C4.

The member recognizing unit 111 recognizes coordinate values $(x3-x2-\alpha, y3-y2-\beta)$ obtained by subtracting a dimension x2 of the member C4 in the length direction and a dimension y2 of the member C4 in the width direction from the coordinate values (x3-α, y3-β) of the vertex V5 as coordinate values of a vertex V6 placed diagonally to the vertex V2.

FIG. 5C is a diagram of the core equipment simplified outline C2 in FIG. 5A viewed from the Y-axis direction. For the sake of simplicity of description, in FIG. 5C, coordinate values are represented by one dimension in the Z-axis.

Furthermore, the member recognizing unit 111 recognizes the Z-axis range of the guide position based on the vertices of the core equipment simplified outline C2. More specifically, if a value Z1 of the Z-axis is a vertex V7 having the maximum value in the Z-axis coordinate values of the vertices included in the core equipment simplified outline C2, the member recognizing unit 111 recognizes a Z-axis coordinate value of one end of the guide position of the frame member C3 as z1+γ/2 (γ≥0). Furthermore, if a value z2 of the Z-axis is a vertex V8 having the minimum value in the Z-axis coordinate values of the vertices included in the core equipment simplified outline C2, the member recognizing unit 111 recognizes a Z-axis coordinate value of one end of the guide position as z2-γ/2.

In this case, the length of the member in the Z-axis direction is longer by γ than a length z3 (z1-z2) of the core equipment simplified outline C2 in the Z-axis direction, Incidentally, the member recognizing unit 111 reads γ from a predetermined setup file. For example, a user can freely change the value of γ by editing the setup file.

As described above, the member recognizing unit 111 recognizes the existence range of X-axis, Y-axis, and Z-axis coordinate values of the member as the guide position.

Incidentally, instead of the processes at STEPs 130 and 131 in FIG. 3A, the member recognizing unit 111 can recognize the guide position of a member by the interference determining unit 113 identifying the arrangement position of the member where there is no interference with the core equipment C1.

Figure 5D:
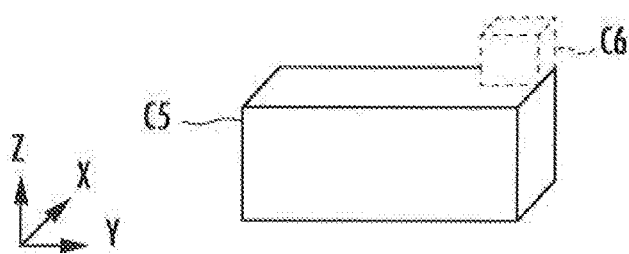
FIG. 5D is a diagram explaining the case where a guide position in which a member is stuck to the core equipment is recognized.

Incidentally, STEPs 130 and 131 in FIG. 3A are processes of recognizing the position of a member for surrounding core equipment as the guide position; however, instead of these processes, the member recognizing unit 111 can perform a process of recognizing, as the guide position, the position of a member for sticking a member C6 to core equipment C5 as shown in FIG. 5D to arrange the member C6. FIG. 5D shows the arrangement start position of the frame member C6 stuck to the top surface of the core equipment C5. This position is decided based on, for example, coordinate values of one vertex of the top surface of the core equipment C5 and the dimensions of the frame member.

At STEP 132 in FIG. 3A, the member recognizing unit 111 displays a screen including the member arranged in the guide position based on the recognized guide position on the user terminal display 13.

At STEP 133 in FIG. 3B, the object recognizing unit 112 recognizes the type, dimensions, position, and posture of an individual member in accordance with an input of the user U1 to the user terminal input unit 12.

At STEP 134 in FIG. 3B, with reference to part data 154, the member recognizing unit 111 displays a member arrangement image P42 of a member based on the type, dimensions, position, and posture of the member on the user terminal display 13 as shown in FIG. 4D.

A member arrangement screen P4 includes the respective images P15, P25, and P35 of the assembled product, the core equipment, and the simplified model and a three-dimensional coordinate system image P41 including the image P42 of the member recognized in accordance with the user's input.

A user can select the type of a member by performing a first operation, such as a right click, on the three-dimensional coordinate system image P41, and can select the positions of both ends of the member to be arranged by performing a second operation, such as a left click, on a predetermined position of the three-dimensional coordinate system image P41. Furthermore, the user can confirm the arrangement of the member in a guide position by performing a third operation, such as a double click, on the member arranged in the guide position.

The member recognizing unit 111 recognizes the type, dimensions, position, and posture of the member based on the first and second operations on this three-dimensional coordinate system image P41 which have been detected by the user U1 to the user terminal input unit 12.

After STEP 134, the processes at STEPS 121 and onward in FIG. 3A are performed again.

If a result of the determination by the operation recognizing unit 110 at STEP 122 in FIG. 3A is "interference checking process", at STEP 135 in FIG. 3A, the interference determining unit 113 determines interference between the members composing the structure (including the members composing the assembled product) and the core equipment (including the simplified model) in accordance with an input of the user U1 to the user terminal input unit 12.

More specifically, the interference determining unit 113 compares an existence area of each of the members composing the structure (including the members composing the assembled product) confirmed based on the position and posture of the member with an existence area of the core equipment confirmed based on the position and posture of the core equipment (in the case of the simplified model, the shape, position, and posture of the simplified model), and determines whether or not they are in an interference state in which the existence areas overlap with each other.

Figure 6A:
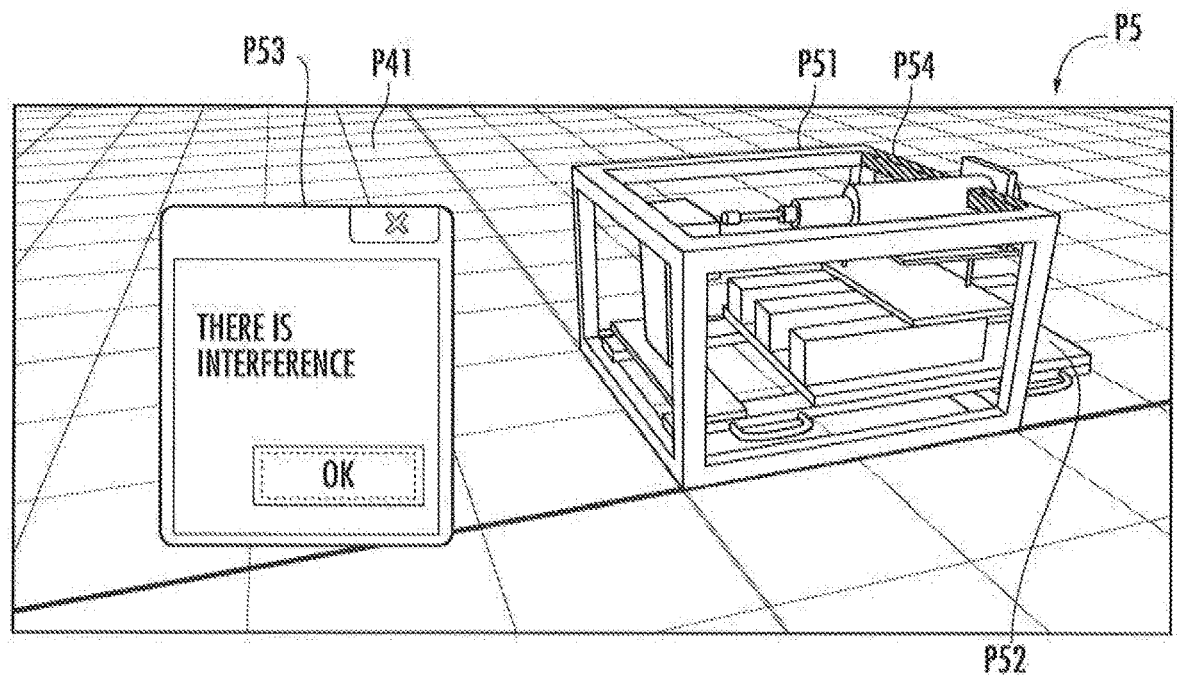
FIG. 6A is a diagram showing an interference-state warning image.

If a result of the determination by the interference determining unit 113 at STEP 135 in FIG. 3A is "interference state", at STEP 136 in FIG. 3B, the warning unit 114 displays an interference warning screen P5 shown in FIG. 6A on the user terminal display 13.

The interference warning screen P5 includes an image P51 of the members composing the structure (including the members included in the assembled product), an image P52 of the core equipment (including the simplified model), a display P53 indicating that there is interference, and an image P54 of an interfering member displayed in a different color which are displayed on the three-dimensional coordinate system image P41. At this time, an interfering portion of the core equipment is displayed in the normal color of the core equipment. In other words, even when the core equipment interferes with something, the color of the core equipment is not changed.

Figure 6B:
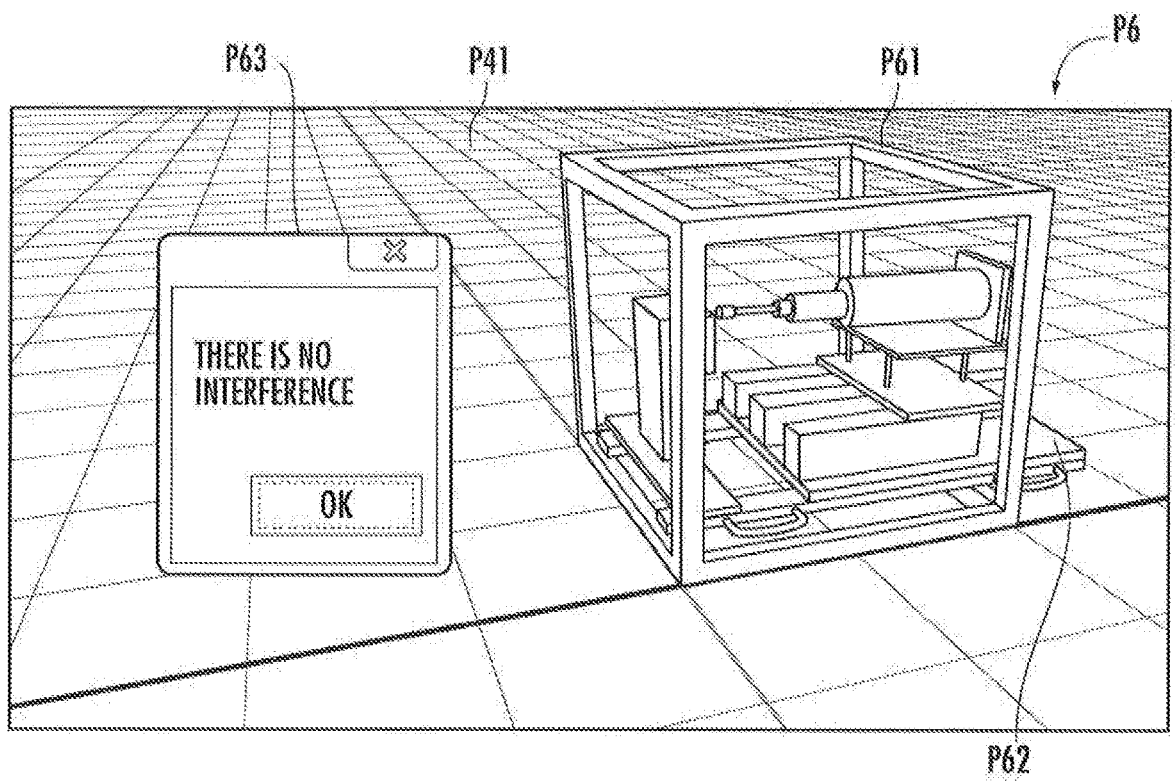
FIG. 6B is a diagram showing an interference-state report image.

If a result of the determination by the interference determining unit 113 at STEP 135 in FIG. 3A is "non-interference state", at STEP 137 in FIG. 3B, the warning unit 114 displays a non-interference report screen P6 shown in FIG. 6B on the user terminal display 13.

The non-interference report screen P6 includes an image P61 of the members (including the members included in the assembled product), an image P62 of the core equipment (including the simplified model), and a display P63 indicating that there is no interference which are displayed on the three-dimensional coordinate system image P41.

After STEP 136 or 137, the processes at STEPs 121 and onward in FIG. 3A are performed again.

Incidentally, even when an interference checking process is not specified by a user, the processes at STEPs 135 to 137 can be performed after the process at STEP 123, 125, 127, or 133, or the processes at STEPs 135 to 137 can be performed after the process at STEP 124, 126, 128, or 134.

If a result of the determination by the operation recognizing unit 110 at STEP 122 in FIG. 3A is "end process", at STEP 138 in FIG. 3A, the order placing unit 115 generates structure data 155 and order placement data 156 based on the type, dimensions, position, and posture of each of the members (including the members included in the assembled product) and ends the design assistance process.

STEP 123 in FIG. 3B and STEP 133 in FIG. 3B each correspond to a "member recognizing step" in a design assistance method of the present invention; STEP 125 in FIG. 3B and STEP 127 in FIG. 3B each correspond to an "object recognizing step" of the present invention; STEP 135 in FIG. 3A corresponds to an "interference determining step" of the present invention; STEP 136 in FIG. 3B corresponds to a "warning output step" of the present invention.

Incidentally, the user terminal arithmetic processing unit 11 performs STEP 123 in FIG. 3B or STEP 133 in FIG. 3B thereby serving as a "member recognizing unit" in a design assistance program of the present invention, performs STEP 125 in FIG. 3B or STEP 127 in FIG. 3B thereby serving as an "object recognizing unit" of the present invention, performs STEP 135 in FIG. 3A thereby serving as an "interference determining unit" of the present invention, and performs STEP 136 in FIG. 3B thereby serving as a "warning output unit" of the present invention.

(Effects of the Present Embodiment)

According to the present embodiment, the type, dimensions, position, and posture of each member (including each member included in an assembled product) are recognized by the member recognizing unit 111 in accordance with an input of a user U1 (STEP 123 or 133 in FIG. 3B), and the shape (including the shape shown in CAD data), dimensions (including the dimensions shown in the CAD data), position, and posture of core equipment (including a simplified model) are recognized by the object recognizing unit 112 in accordance with an input of the user U1 (STEP 125 or 127 in FIG. 3B).

Then, an existence area of each member confirmed by the dimensions, position, and posture of the member is compared with an existence area of the core equipment defined by the position and posture of the core equipment, and whether or not they are in art interference state in which the existence areas overlap with each other is determined by the interference determining unit 113 (STEP 135 in FIG. 3A).

Then, if the interference determining unit 113 has determined that the member and the core equipment interfere with each other ("interference state" at STEP 135 in FIG. 3A), together with an image P53 indicating that the member and the core equipment interfere with each other, the warning unit 114 displays an image P54 in which the color of the member interfering with the core equipment has been changed on the user terminal display 13 (STEP 136 in FIG. 3B).

Accordingly, the user U1 who is a designer of the structure A1 can easily recognize whether or not a member interferes with the core equipment when designing, and, furthermore, cart easily perceive the interfering member; therefore, it is possible to reduce the burden on the designer of the structure A1 (the user U1) when designing the structure A1.

Particularly, the shape, dimensions, position, and posture of the core equipment housed in the structure A1 significantly affect the design of the structure A1; however, the shape, dimensions, position, and posture of the core equipment are recognized by the object recognizing unit 112, and the presence or absence of interference between the core equipment and each member is determined by the interference determining unit 113, thereby the designer of the structure A1 (the user U1) will not have to worry too much about the shape, dimensions, position, and posture of the core equipment.

Accordingly, the burden on the designer of the structure A1 (the user U1) when designing the structure A1 is reduced.

Furthermore, CAD data of the core equipment is read through the "core equipment CAD data reading process" (STEP 126 in FIG. 3B), thereby the detailed shape and dimensions of the core equipment are recognized by the object recognizing unit 112. This enables the designer of the structure A1 to properly perceive the shape and dimensions of the core equipment; therefore, the burden on the designer of the structure A1 (the user U1) is reduced.

Moreover, as the core equipment is not an object to be designed, the shape and dimensions of the core equipment can be rough to a certain degree; however, in the "simplified model reading process", the shape and dimensions of a simplified model are recognized as the core equipment by the object recognizing unit 112 in accordance with an input of the user U1 (STEP 127 in FIG. 3B).

As a result, for example, even in the case where the user U1 does not have CAD data of the core equipment or the case where the shape of the core equipment is not clearly defined, the shape and dimensions of the core equipment are recognized; therefore, in the specification of the shape and dimensions of the core equipment, the burden on the designer of the structure A1 (the user U1) is reduced.

The member recognizing unit 111 recognizes the simplified outline C2 of the core equipment C1 (STEP 130 in FIG. 3A), and recognizes respective guide positions of the members C3 and C4 surrounding the simplified outline C2 (STEP 131 in FIG. 3A), and then displays an image of the members arranged in the guide positions on the user terminal display 13 (STEP 132 in FIG. 3A). This enables the user U1 to easily recognize the arrangement points of the members of the structure which houses the core equipment C1; therefore, the burden on the designer of the structure A1 (the user U1) is reduced.

(Modified Form)

In the present embodiment, the "design assistance system" of the present invention is composed of the user terminals 10; however, it is not limited to this configuration. For example, the "design assistance system" of the present invention can be composed of the user terminals 10 and the vendor terminal 20. In this case, the vendor terminal arithmetic processing unit 21 recognizes an input to the user terminal input unit 12 through communication and performs a predetermined arithmetic process, thereby serving as a member recognizing unit, an object recognizing unit, and an interference determining unit, and the user terminal arithmetic processing unit 11 having received a result of determination by the interference determining unit displays an image indicating the result of determination on the user terminal display 13, thereby the user terminal arithmetic processing unit 11 and the user terminal display 13 serve as a warning output unit of the present invention.

Furthermore, when reading a template, the member recognizing unit 111 can perform the same processes as STEPs 129 to 132 in FIG. 3A, thereby recognizing the guide position of each member included in the template, and display each member included in the template based on the guide position.

DESCRIPTION OF REFERENCE NUMERALS

10 user terminal
111 member recognizing unit
112 object recognizing unit
113 interference determining unit
114 warning unit
12 user terminal input unit
13 user terminal display
15 user terminal storage device
20 vendor terminal
30 manufacturer terminal

The invention claimed is:

1. A design assistance system which assists design of a structure composed of a combination of a plurality of members with CAD (Computer Aided Design), the design assistance system comprising a CPU (Central Processing Unit) configured:
   to receive specification of a position, which is on a three-dimensional coordinate system and input by a user, of an object, and to recognize an object existence area which is an existence area of the object on the three-dimensional coordinate system in accordance with the position of the object which has been specified by the user;
   to initiate a member arranging process, wherein the object is positioned in the position specified on the three-dimensional coordinate system, and a position for surrounding the object or a position for sticking to the object is recognized as a guide position, which is a candidate arrangement position of an additional member to be newly arranged, based on the object is recognized existence area;
   to arrange the additional member in the guide position on the three-dimensional coordinate system, and to cause an image display unit to display an image of the additional member arranged in the guide position and an image of the object;
   to determine arrangement of the additional member in the guide position according to an input by the user;
   to recognize member existence areas which are respective existence areas of plurality of members including the additional member of which arrangement has been determined and composing a structure being different from the object on the three-dimensional coordinate system in accordance with an input by the user;
   to determine presence or absence of interference between each of the plurality of members and the object based on the member existence areas of the plurality of members and the object existence area; and
   to cause an output device to output information indicating that at least one of the members and the object interfere with each other, provided that the at least one of the members and the object have been determined to interfere with each other.

2. The design assistance system according to claim 1, wherein the CPU is configured to recognize the member existence areas in accordance with information including a position of one of the members or a position of an assembled product composed of the plurality of members which has been specified by the user.

3. The design assistance system according to claim 1, wherein the CPU is configured to create structure data, which is CAD data of the structure, and order placement data including a user ID for identifying the user and a structure ID for identifyingthe structure based on information of the plurality of members.

4. The design assistance system according to claim 1, wherein the CPU is configured to recognize the guide position based on a parameter related to the guide position input by the user.

5. The design assistance system according to claim 1, wherein the CPU is configured to recognize an arrangement position of the member, in which absence of the interference between the member and the object is determined by the CPU, as the guide position.

6. The design assistance system according to claim 1, wherein the CPU is configured to recognize a simplified outline which has a different shape from a shape of the object, to recognize an existence area on the three-dimensional coordinate system, which is determined based on a position and a posture of the simplified outline, as the object existence area, and to recognize a position of the additional member for surrounding the simplified outline as the guide position.

7. The design assistance system according to claim 1, wherein the CPU is configured to recognize a simplified outline which has a different shape from a shape of the object, to recognize an existence area on the three-dimensional coordinate system which is determined based on a position and a posture of the simplified outline, as the object existence area, and to recognize a position of the additional member, for sticking the additional member to the simplified outline to arrange the additional member, as the guide position.

8. A non-transitory computer readable medium storing a program, the program causing a computer:
   to receive specification of a position, which is on a three-dimensional coordinate system and input by a user, of an object, and to recognize an object existence area which is an existence area of the object on the three-dimensional coordinate system in accordance with the position of the object which has been specified by the user;
   to initiate a member arranging process, wherein the object is positioned in the position specified on the three-dimensional coordinate system, and a position for surrounding the object or a position for sticking to the object is recognized as a guide position, which is a candidate arrangement position of an additional member to be newly arranged, based on the object existence area;
   to arrange the additional member in the guide position on the three-dimensional coordinate system, and to cause an image display unit to display an image of the additional member arranged in the guide position and an image of the object;
   to determine arrangement of the additional member in the guide position according to an input by the user;
   to recognize member existence areas which are respective existence areas of plurality of members including the additional member of which arrangement has been determined and composing a structure being different from the object on the three-dimensional coordinate system in accordance with an input by the user;

to determine presence or absence of interference between each of the plurality of members and the object based on the member existence areas of the plurality of members and the object existence area; and to cause an output device to output information indicating that at least one of the members and the object interfere with each other, provided that the at least one of the members and the object have been determined to interfere with each other.

9. A design assistance method implemented by a computer comprising:

receiving specification of a position, which is on a three-dimensional coordinate system and input by a user, of an object, and recognizing an object existence area which is an existence area of the object on the three-dimensional coordinate system in accordance with the position of the object which has been specified by the user;

initiating a member arranging process, wherein the object is positioned in the position specified on the three-dimensional coordinate system, and a position for surrounding the object or a position for sticking to the object is recognized as a guide position, which is a candidate arrangement position of an additional member to be newly arranged, based on the object existence area;

arranging the additional member in the guide position on the three-dimensional coordinate system, and causing an image display unit to display an image of the additional member arranged in the guide position and an image of the object;

determining arrangement of the additional member in the guide position according to an input by the user;

recognizing member existence areas which are respective existence areas of plurality of members including the additional member of which arrangement has been determined and composing a structure being different from the object on the three-dimensional coordinate system in accordance with an input by the user; determining presence or absence of interference between each of the plurality of members and the object based on the member existence areas of the plurality of members and the object existence area; and causing an output device to output information indicating that at least one of the members and the object interfere with each other, provided that the at least one of the members and the object have been determined to interfere with each other.

* * * * *